United States Patent
Ohishi et al.

(10) Patent No.: US 11,817,081 B2
(45) Date of Patent: Nov. 14, 2023

(54) LEARNING DEVICE, LEARNING METHOD, LEARNING PROGRAM, RETRIEVAL DEVICE, RETRIEVAL METHOD, AND RETRIEVAL PROGRAM

(71) Applicants: NIPPON TELEGRAPH AND TELEPHONE CORPORATION, Tokyo (JP); Massachusetts Institute of Technology, Cambridge, MA (US)

(72) Inventors: Yasunori Ohishi, Musashino (JP); Akisato Kimura, Musashino (JP); Takahito Kawanishi, Musashino (JP); Kunio Kashino, Musashino (JP); James R. Glass, Winchester, MA (US); David Harwath, Boston, MA (US)

(73) Assignees: NIPPON TELEGRAPH AND TELEPHONE CORPORATION, Tokyo (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 358 days.

(21) Appl. No.: 17/218,165

(22) Filed: Mar. 31, 2021

(65) Prior Publication Data
US 2022/0319493 A1 Oct. 6, 2022

(51) Int. Cl.
*G10L 15/02* (2006.01)
*G10L 15/22* (2006.01)
*G06N 3/08* (2023.01)

(52) U.S. Cl.
CPC .............. *G10L 15/02* (2013.01); *G06N 3/08* (2013.01); *G10L 15/22* (2013.01); *G10L 2015/223* (2013.01)

(58) Field of Classification Search
None
See application file for complete search history.

(56) References Cited

U.S. PATENT DOCUMENTS 11,003,856 B2 * 5/2021 Kiros .................... G06F 40/289
2018/0039859 A1 * 2/2018 Harwath ............... G06V 20/35
(Continued)

OTHER PUBLICATIONS

Havard, William N.; Models of visually grounded speech signal pay attention to nouns: A bilingual experiment on english and japanese. In: ICASSP 2019-2019 IEEE International Conference on Acoustics, Speech and Signal Processing (ICASSP). IEEE, 2019. p. 8618-8622 (Year: 2019).*

(Continued)

*Primary Examiner* — Jonathan C Kim
(74) *Attorney, Agent, or Firm* — XSENSUS LLP

(57) ABSTRACT

A learning device calculates an image feature using a model (image encoder) that receives an image and outputs the image feature obtained by mapping the image into a latent space. The learning device calculates an audio feature using a model (audio encoder) that receives a speech in a predetermined language and outputs the audio feature obtained by mapping the speech into the latent space, and that includes a neural network provided with a self-attention mechanism. The learning device updates parameters of the models used by an image feature calculation unit and an audio feature calculation unit such that the image feature of a first image is similar to the audio feature of a speech corresponding to the first image.

9 Claims, 17 Drawing Sheets

(56) References Cited

U.S. PATENT DOCUMENTS

| | | | | |
|---|---|---|---|---|
| 2018/0204354 | A1* | 7/2018 | Kimura | G06V 10/82 |
| 2018/0268023 | A1* | 9/2018 | Korpusik | G06F 40/30 |
| 2019/0258713 | A1* | 8/2019 | Kiros | G06F 40/20 |
| 2021/0073252 | A1* | 3/2021 | Guo | G06N 3/08 |
| 2021/0232773 | A1* | 7/2021 | Wang | G06F 18/21 |
| 2022/0044022 | A1* | 2/2022 | Gan | G06V 20/46 |
| 2022/0067438 | A1* | 3/2022 | Li | G06N 3/044 |
| 2022/0319493 | A1* | 10/2022 | Ohishi | G10L 15/22 |
| 2022/0319495 | A1* | 10/2022 | Ohishi | G06N 20/00 |
| 2023/0252993 | A1* | 8/2023 | Kumar | G10L 15/25 704/232 |

OTHER PUBLICATIONS

Harwath, David; Chuang, Galen; Glass, James. Vision as an interlingua: Learning multilingual semantic embeddings of untranscribed speech. In: 2018 IEEE International Conference on Acoustics, Speech and Signal Processing (ICASSP). IEEE, 2018. p. 4969-4973. (Year: 2018).*

Chrupała, Grzegorz; Gelderloos, Lieke; Alishahi, Afra. Representations of language in a model of visually grounded speech signal. arXiv preprint arXiv:1702.01991, 2017. (Year: 2017).*

Ilharco, Gabriel; Zhang, Yuan; Baldridge, Jason. Large-scale representation learning from visually grounded untranscribed speech. arXiv preprint arXiv:1909.08782, 2019. (Year: 2019).*

Ohishi, Yasunori, et al. Pair Expansion for Learning Multilingual Semantic Embeddings Using Disjoint Visually-Grounded Speech Audio Datasets. In: Interspeech. 2020. p. 1486-1490. (Year: 2020).*

Kottur S, Vedantam R, Moura JM, Parikh D. Visual word2vec (vis-w2v): Learning visually grounded word embeddings using abstract scenes. InProceedings of the IEEE Conference on Computer Vision and Pattern Recognition 2016 (pp. 4985-4994). (Year: 2016).*

Harwath et al., "Jointly Discovering Visual Objects and Spoken Words from Raw Sensory Input", International Journal of Computer Vision, vol. 128 (2020), Available Online at: https://doi.org/10.1007/s11263-019-01205-0, Aug. 5, 2019, pp. 620-641.

Welcome to ICASSP 2020!, Signal Processing: from Sensors to Information, at the Heart of Data Science, Virtual Barcelona, May 4-8, 2020, https://2020.ieeeicassp.org/, 15 pages.

IEEE ICASSP 2020, Barcelona, Spain, May 4-8, 2020, https://cmsworkshops.com/ICASSP2020/TechnicalProgram.asp, 1 page.

Technical Program, MMSP-L1: Signal Processing for Multimedia Applications II, IEEE ICASSP 2020, Barcelona, Spain, May 4-8, 2020, https://cmsworkshops.com/ICASSP2020/Papers/ViewSession.asp?Sessionid=1094, 1 page.

Yasunori Ohishi, et al., "Trilingual Semantic Embeddings of Visually Grounded Speech with Self-Attention Mechanisms", IEEE, ICASSP 2020, 5 pages.

* cited by examiner

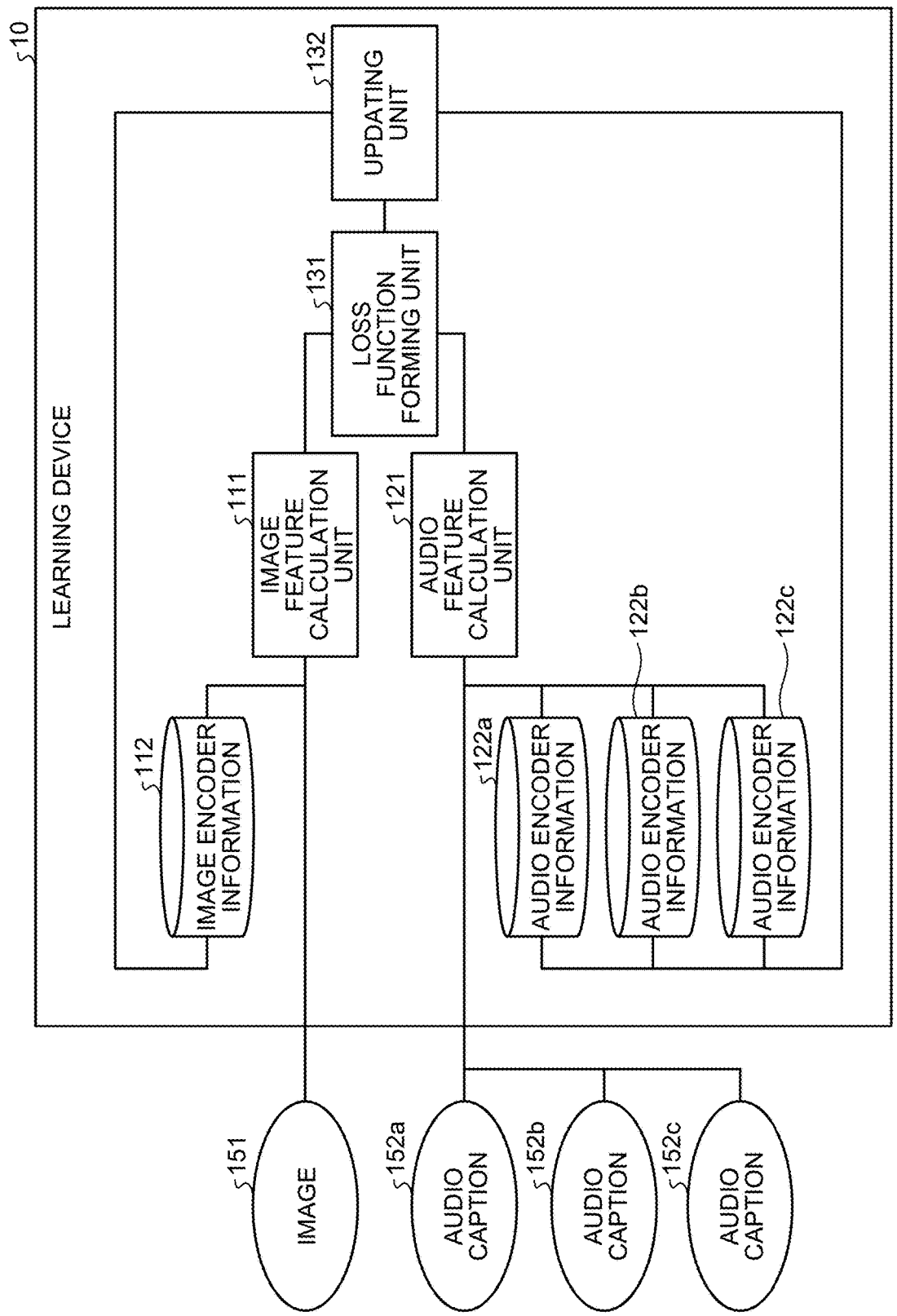

FIG.2

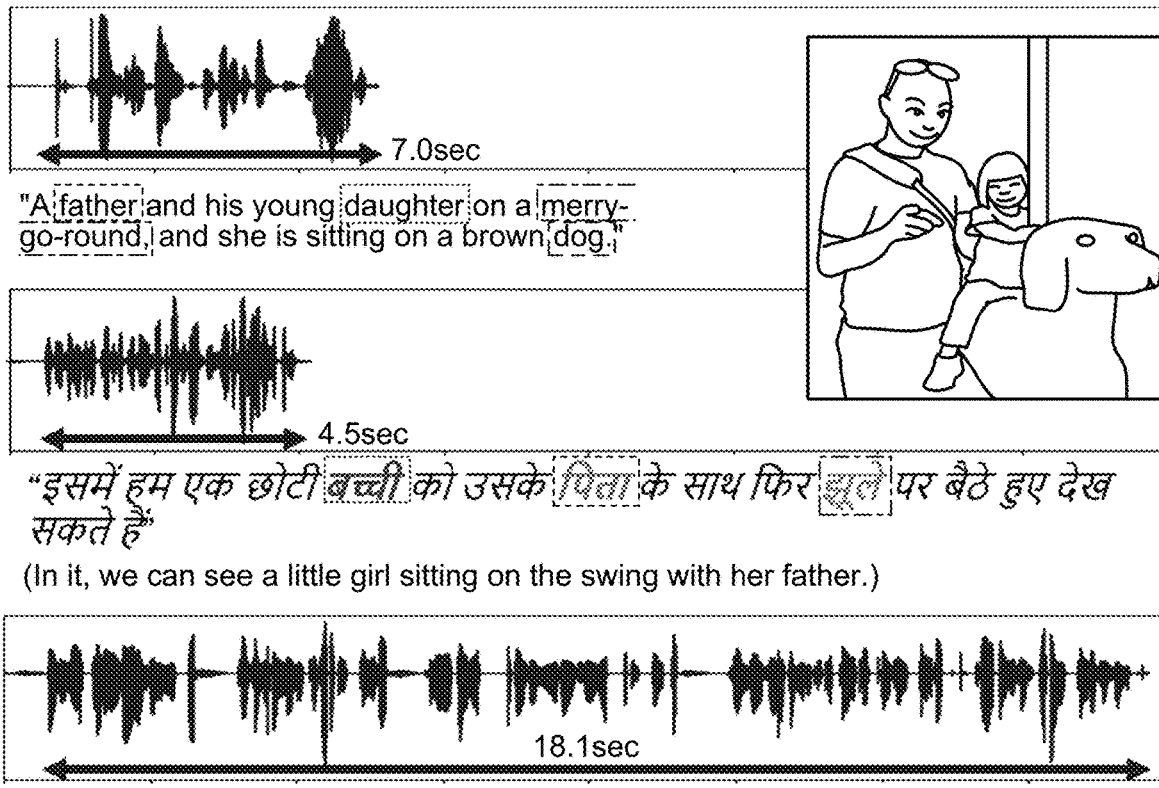

"A father and his young daughter on a merry-go-round, and she is sitting on a brown dog."

"इसमें हम एक छोटी बच्ची को उसके पिता के साथ फिर झूले पर बैठे हुए देख सकते हैं"

(In it, we can see a little girl sitting on the swing with her father.)

"犬のメリーゴーランドに乗った小さな女の子が写っている。その横にお父さんののような男性が写っていてサングラスを頭につけてリュックを背負っている。こっちをさして笑っている写真。"

(We can see a little girl riding a merry-go-round dog. A man who looks like her dad appears next to her, wearing sunglasses on his head and carrying a backpack. He is pointing here and laughing.)

FIG.3

|  | Average duration | Average word count |
|---|---|---|
| English | 9.5 seconds | 19.3 words |
| Hindi | 11.4 seconds | 20.4 words |
| Japanese | 19.7 seconds | 44.6 words |

English caption: "A mountain rock foundation with a lot of dirt on the ground and rock"

Japanese caption: "真っ青な空の下に白い岩山がある。地面も真っ白で波のような形をした大きな岩山が連なっていて、さらに大きな岩山が上のほうに乗り出していて複雑な形になっている"

FIG.13

Monolingual models

| | w/o self-attention layer ||| |||
|---|---|---|---|---|---|---|
| | Audio to Image ||| Image to Audio |||
| | R@1 | R@5 | R@10 | R@1 | R@5 | R@10 |
| E | .105 | .313 | .437 | .075 | .261 | .403 |
| H | .090 | .258 | .365 | .083 | .252 | .335 |
| J | .190 | .488 | .626 | .164 | .431 | .582 |
| avg. | .128 | .353 | .476 | .107 | .315 | .440 |

| | w/self-attention layer ||| |||
|---|---|---|---|---|---|---|
| E | .145 | .355 | .477 | .119 | .317 | .452 |
| H | .094 | .274 | .390 | .089 | .249 | .373 |
| J | .204 | .515 | .651 | .214 | .489 | .635 |
| avg. | .148 | .381 | .506 | .141 | .352 | .487 |

| | w/self-attention layer and masked margin softmax loss ||| |||
|---|---|---|---|---|---|---|
| E | .141 | .364 | .481 | .118 | .322 | .457 |
| H | .098 | .280 | .401 | .099 | .247 | .380 |
| J | .200 | .510 | .642 | .218 | .475 | .637 |
| avg. | .146 | .385 | .508 | .145 | .348 | .490 |

FIG. 14

Trilingual models

| | w/o self-attention layer | | | | | |
|---|---|---|---|---|---|---|
| E | .143 | .382 | .518 | .103 | .342 | .484 |
| H | .103 | .299 | .429 | .110 | .295 | .399 |
| J | .210 | .515 | .667 | .158 | .435 | .604 |
| avg. | .152 | .399 | .538 | .124 | .357 | .496 |

| | w/ self-attention layer and masked margin softmax loss | | | | | |
|---|---|---|---|---|---|---|
| E | .139 | .395 | .529 | .116 | .358 | .508 |
| H | .112 | .315 | .445 | .108 | .313 | .419 |
| J | .203 | .520 | .667 | .200 | .468 | .623 |
| avg. | .151 | .410 | .547 | .141 | .380 | .517 |

FIG. 15

Table 3. Cross-lingual retrieval for trilingual models

| | w/o self-attention layer | | | | | |
|---|---|---|---|---|---|---|
| | Audio to Audio (→) | | | Audio to Audio (←) | | |
| | R@1 | R@5 | R@10 | R@1 | R@5 | R@10 |
| E↔H | .055 | .188 | .278 | .055 | .176 | .261 |
| H↔J | .051 | .193 | .294 | .063 | .210 | .286 |
| J↔E | .072 | .234 | .328 | .069 | .221 | .328 |

| | w/ self-attention layer and masked margin softmax loss | | | | | |
|---|---|---|---|---|---|---|
| E↔H | .076 | .225 | .313 | .076 | .225 | .313 |
| H↔J | .085 | .248 | .334 | .104 | .246 | .350 |
| J↔E | .106 | .317 | .441 | .105 | .312 | .437 |

FIG.18
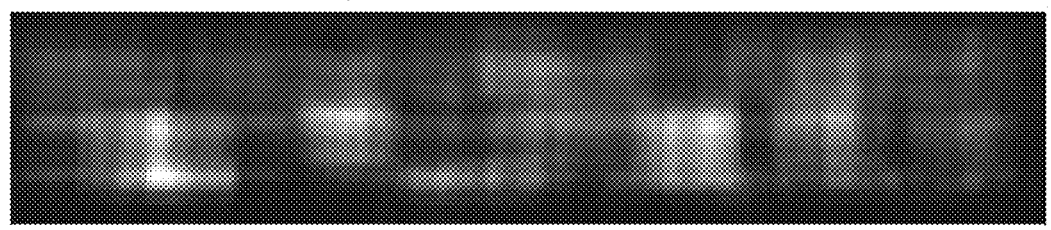
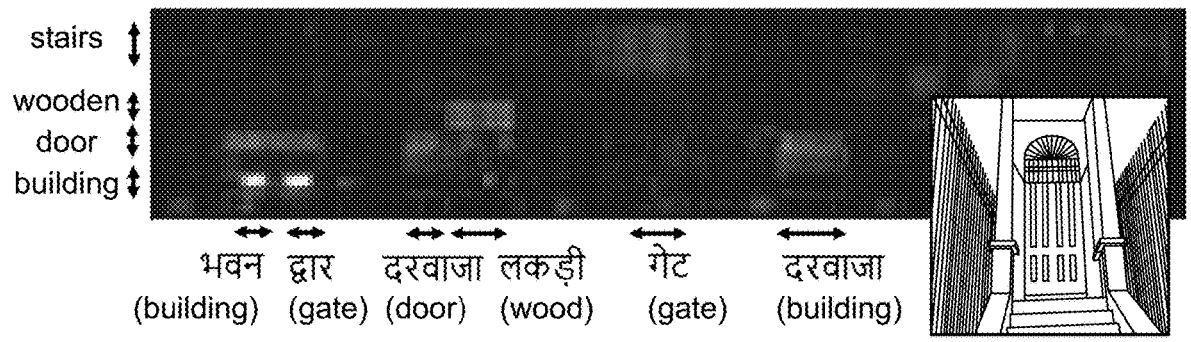
English caption: "Stairs leading up to double wooden doors in a brick building"
Hindi caption: " इस चित्र में एक भवन के मुख्य द्वार को देखा जा सकता है यह दरवाजा लकड़ी का बना है तथा इसके आगे एक लोहे का गेट भी है जिसे खोला गया है दरवाजा बंद है और दोनों तरफ लोहे के काले रंग की जालियों को देख सकते हैं"

LEARNING DEVICE, LEARNING METHOD, LEARNING PROGRAM, RETRIEVAL DEVICE, RETRIEVAL METHOD, AND RETRIEVAL PROGRAM

FIELD

The present invention relates to a learning device, a learning method, a learning program, a retrieval device, a retrieval method, and a retrieval program.

BACKGROUND

Image recognition technologies enable identification of a variety of objects displayed in an image. Furthermore, technologies are known that associate linguistic information with visual information by labeling images. For example, a technology is known in which a large number of pieces of paired data of images and speeches (hereinafter, called an audio caption) for describing the content of the images are prepared, and an area of an image is associated with a segment of a speech (hereinafter, called an audio segment) (for example, David Harwath, Adria Recasens, Didac Suris, Galen Chuang, Antonio Torralba, and James Glass, "Jointly Discovering Visual Objects and Spoken Words from Raw Sensory Input," International Journal of Computer Vision (2019) (https://doi.org/10.1007/s11263-019-01205-0)).

The conventional technologies, however, have a problem in that the visual information may be difficult to be accurately associated with the linguistic information. For example, the technology described in Non Patent Literature 1 may have difficulty in clearly identifying the audio segment in which a word or words indicating an object displayed in an image is spoken from the audio caption.

SUMMARY

According to an aspect of the embodiments, a learning device includes: a memory; and a processor coupled to the memory and programmed to execute a process comprising: firstly calculating an image feature using a model that receives an image and outputs the image feature obtained by mapping the image into a first space; secondly calculating an audio feature using a model that receives a speech in a predetermined language and outputs the audio feature obtained by mapping the speech into the first space, and that includes a neural network provided with a self-attention mechanism; and updating parameters of the models used by the firstly calculating and the secondly calculating such that the image feature of a first image is similar to the audio feature of a speech corresponding to the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration example of a learning device according to a first embodiment of the present invention.

FIG. 2 is an explanatory diagram explaining audio captions.

FIG. 3 is a chart illustrating examples of durations of the audio captions in respective languages.

FIG. 13 is a chart illustrating experimental results obtained using monolingual models.

FIG. 14 is a chart illustrating experimental results obtained using multilingual models.

FIG. 15 is a chart illustrating experimental results of retrieval between different languages.

FIG. 18 is a diagram illustrating examples of translation knowledge.

Figure 4:
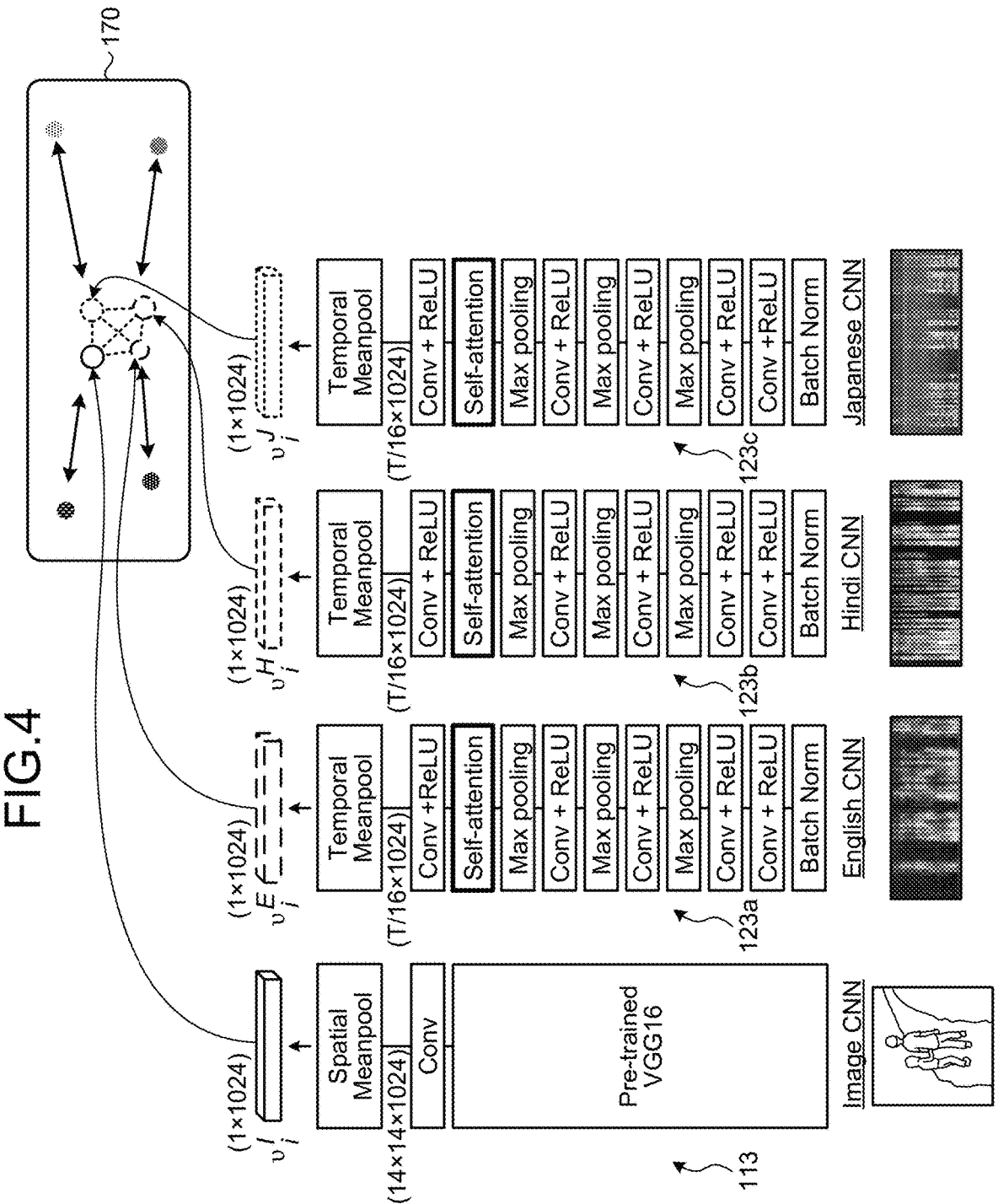
FIG. 4 is a schematic diagram of encoders and a latent space.

The following describes embodiments of a learning device, a learning method, a learning program, a retrieval device, a retrieval method, and a retrieval program according to the present application in detail based on the drawings. The present invention is not limited to the embodiments described below.

FIRST EMBODIMENT

A learning device according to a first embodiment of the present invention uses received learning data to train an image encoder and an audio encoder. The learning device outputs the encoders after being trained. For example, the learning device outputs parameters of the encoders. The learning device may train audio encoders corresponding to a plurality of languages. The learning data is data including images and speeches associated with the images.

The image encoder is a model that receives an image and outputs an image feature. The audio encoder is a model that receives a speech in a predetermined language and outputs an audio feature. The learning device trains the image encoder and the audio encoder such that the image feature output from the image encoder based on the image is similar to the audio feature output from the audio encoder based on the speech corresponding to the image.

Configuration of First Embodiment

FIG. 1 is a diagram illustrating a configuration example of the learning device according to the first embodiment. As illustrated in FIG. 1, a learning device 10 includes an image feature calculation unit 111, an audio feature calculation unit 121, a loss function forming unit 131, and an updating unit 132. The learning device 10 stores image encoder information 112, audio encoder information 122a, audio encoder information 122b, and audio encoder information 122c.

The learning device 10 receives an image 151, an audio caption 152a, an audio caption 152b, and an audio caption 152c. The learning device 10 can output the image encoder information 112, the audio encoder information 122a, the audio encoder information 122b, and the audio encoder information 122c that have been updated.

The audio caption is a speech corresponding to the image. For example, the audio caption is represented by a signal obtained by recording a speech spoken for explaining the content of the image by a person who has viewed the image. The audio caption may be obtained, for example, using crowdsourcing to show the image to speakers of the respective languages and record speeches spoken by the speakers for explaining the image.

FIG. 2 is an explanatory diagram explaining the audio captions. FIG. 2 illustrates the audio captions in three different languages received by the learning device 10 in the present embodiment. As illustrated in FIG. 2, in the present embodiment, the learning device 10 receives the audio captions in English, Hindi, and Japanese.

The audio caption 152a in FIG. 1 is, for example, an audio caption in English. The audio caption 152b in FIG. 1 is, for example, an audio caption in Hindi. The audio caption 152c in FIG. 1 is, for example, an audio caption in Japanese. A text in each of the languages corresponding to the audio caption in FIG. 2 is displayed merely for explanation, and is not included in the audio caption. A text obtained by translating the Hindi text into English is illustrated under the text in Hindi. A text obtained by translating the Japanese text into English is illustrated under the text in Japanese.

In the example of FIG. 2, the speakers of the respective languages view the same image. In other words, the speakers of the respective languages view an image displaying two people and a merry-go-round. However, the contents and durations of the obtained audio captions vary from one another. In other words, a plurality of audio captions in different languages do not necessarily have a relation of parallel translation to one another. This is caused by, for example, differences in culture and vocabulary among the languages.

FIG. 3 is a chart illustrating examples of the durations of the audio captions in the respective languages. In the example of FIG. 3, the average duration of the audio caption corresponding to the same image is longer in the order of Japanese, Hindi, and English, and the word count is also larger in the same order. The audio encoder of the present embodiment can map the audio captions different in language and also different in duration and word count into the same space.

The image feature calculation unit 111 calculates the image feature using the image encoder serving as the model that receives the image and outputs the image feature obtained by mapping the image into a first space. The image encoder information 112 is a set of parameters for building the image encoder.

The image feature calculation unit 111 builds the image encoder with reference to the image encoder information 112. The image feature calculation unit 111 supplies the image 151 to the image encoder to obtain the image feature. In other words, the image feature calculation unit 111 receives the image, and outputs the image feature.

The audio feature calculation unit 121 calculates the audio feature using the audio encoder serving as the model that receives the speech in the predetermined language and outputs the audio feature obtained by mapping the speech into the first space, and that includes a neural network provided with a self-attention mechanism. The audio encoder information 122a, the audio encoder information 122b, and the audio encoder information 122c are sets of parameters for building the audio encoders for the corresponding languages.

The audio feature calculation unit 121 builds the audio encoders with reference to the audio encoder information 122a, 122b, and 122c. The audio feature calculation unit 121 supplies each of the audio captions 152a, 152b, and 152c to a corresponding one of the audio encoders, and obtains the audio feature. In other words, the audio feature calculation unit 121 receives the audio captions, and outputs the audio features. The audio feature calculation unit 121 uses the audio encoders corresponding to the respective different languages to calculate the audio features of the speeches in the respective different languages.

As described above, each of the image encoder and the audio encoders outputs the feature mapped into the first space. The first space is herein called a latent space. The latent space is a space shared by the image feature and the audio features.

The encoders and the latent space will be described in detail using FIG. 4. FIG. 4 is a schematic diagram of the encoders and the latent space. Each of an image encoder 113, an audio encoder 123a, an audio encoder 123b, and an audio encoder 123c includes a convolutional neural network (CNN). The image encoder 113 includes the CNN for the image. The audio encoder 123a includes the CNN for English. The audio encoder 123b includes the CNN for Hindi. The audio encoder 123c includes the CNN for Japanese. The image encoder 113 further includes a layer that performs spatial mean pooling. Each of the audio encoders includes a layer that performs temporal mean pooling. Each of the encoders maps the feature output therefrom into a latent space 170.

Herein, $I_i$ denotes the i-th image. In addition, $A_i^E$, $A_i^H$, and $A_i^J$ denote audio captions in English, Hindi, and Japanese, respectively, corresponding to the image $I_i$. At this time, the image encoder 113 maps the image $I_i$ into the d-dimensional latent space 170. The audio encoder 123a maps the audio caption $A_i^E$ into the d-dimensional latent space 170. The audio encoder 123b maps the audio caption $A_i^H$ into the d-dimensional latent space 170. The audio encoder 123c maps the audio caption $A_i^J$ into the d-dimensional latent space 170. The symbol d denotes the number of dimensions determined in advance. In the present embodiment, for example, d is 1024.

Using FIG. 4, the following describes processing performed by the image feature calculation unit 111 to obtain the image feature. First, the image feature calculation unit 111 supplies a red-green-blue (RGB) image (three-channels) having 224×224 pixels to the image encoder 113. The image encoder 113 includes layers up to conv5 in a pre-trained VGG16 network (refer to Reference Literature 1).

Reference Literature 1: K. Simonyan and A. Zisserman, "Very Deep Convolutional Networks for Large-Scale Image Recognition," in Proc. ICLR, 2015.

The image encoder 113 outputs a 512×14×14 tensor from the layers up to conv5 in the VGG16 network as an intermediate feature. In other words, the image encoder 113 reduces the image having 224×224 pixels to an image having 14×14 pixels. The intermediate feature denotes a feature obtained in the process of the output of the image feature by the image encoder or in the process of the output of the audio feature by each of the audio encoders.

Moreover, the image encoder 113 supplies the 512×14×14 tensor to the cony layer constituted by d filters having a kernel size of 3×3, and outputs a d×14×14 tensor. Furthermore, the image encoder 113 performs the spatial mean pooling in a spatial meanpool layer, and outputs a d-dimensional image feature vector $v_i^I$. The image feature calculation unit 111 obtains the image feature vector output from the image encoder 113 as the image feature. The feature vector can be said to be a vector embedded into the d-dimensional space.

Using FIG. 4, the following describes processing performed by the audio feature calculation unit 121 to obtain each of the audio features. Herein, the audio encoders 123a, 123b, and 123c have the same configuration. Each of the audio encoders 123a, 123b, and 123c may be called an audio encoder 123 without being distinguished from one another.

First, the audio feature calculation unit 121 supplies the audio encoder 123 with T×F mel filter bank output series obtained by performing frequency analysis with a frame shift length of 10 ms and a frame length of 25 ms, and performing mel filter bank processing with 40 mel filter banks on the audio caption. The form of the speech supplied to the audio encoder 123 is not limited to the mel filter bank output series. For example, the audio encoder 123 may be supplied with, for example, a short-time Fourier transform (SIFT) and mel-frequency cepstrum coefficients (MFCCs).

The audio feature calculation unit 121 calculates the audio feature of each of the speeches in the different languages made to have a fixed length by truncation or zero-padding. This calculation enables mini-batch processing of the audio captions having different durations. For example, if the time of the audio caption is longer than T, the audio feature calculation unit 121 truncates the audio caption later than T, and if the time is shorter than T, the audio feature calculation unit 121 performs the zero-padding. The symbol T denotes a duration of the audio caption determined in advance. In the present embodiment, for example, T is 3072 (ms).

The audio encoder 123 includes a CNN-based DAVEnet (refer to Non Patent Literature 1: David Harwath, Adria Recasens, Didac Suris, Galen Chuang, Antonio Torralba, and James Glass, "Jointly Discovering Visual Objects and Spoken Words from Raw Sensory Input," International Journal of Computer Vision (2019) (https://doi.org/10.1007/s11263-019-01205-0)), and a self-attention layer (refer to Reference Literature 2). In the example of FIG. 4, the self-attention layer is disposed on an output side of the DAVEnet.

Reference Literature 2: H. Zhang, I. Goodfellow, D. Metaxas, and A. Odena, "Self-Attention Generative Adversarial Networks," in Proc. ICML, 2019.

The audio encoder 123 outputs a 512×T/16 tensor as the intermediate feature from a max pooling layer serving as the last layer of the DAVEnet. The intermediate feature output by the DAVEnet is denoted as $x \in R^{D \times N}$. To calculate a self-attention map, the audio encoder 123 uses Expressions (1-1) and (1-2) to perform feature conversion in the self-attention layer.

$$f(x) = W_f x \quad (1\text{-}1)$$

$$g(x) = W_g x \quad (1\text{-}2)$$

where $W_f \in \mathbb{R}^{\bar{D} \times D}$, $W_g \in \mathbb{R}^{\bar{D} \times D}$ The symbol D denotes the number of channels. The symbol N corresponds to a duration of the intermediate feature (in this case, T/16). The feature conversion in the self-attention layer is achieved by pointwise convolution performed by a 1×1 convolution layer. For example, in the present embodiment, D is 512, and ‾D (D with an overline) is D/8=64.

Furthermore, the audio encoder 123 uses Expressions (2-1) and (2-2) to calculate a self-attention map β. The symbol β denotes an N×N matrix. The symbol $s_{i,j}$ denotes a degree of similarity between the i-th audio feature and the j-th audio feature. As given by Expression (2-2), the audio encoder 123 calculates the self-attention map β, in which an element $\beta_{i,j}$ is obtained by normalizing $s_{i,j}$ in the row direction using a softmax function.

$$s_{i,j} = f(x_i)^T g(x_j) \quad (2\text{-}1)$$

$$\beta_{i,j} = \frac{\exp(s_{i,j})}{\sum_{k=1}^{T} \exp(s_{i,j})} \quad (2\text{-}2)$$

Furthermore, the audio encoder 123 calculates o=xβ based on the intermediate feature x and the self-attention map, and further obtains y=x+oγ as an output of the self-attention layer. The symbol γ denotes one of the parameters optimized by the training.

Word-level information is known to be obtained in a layer on the output side of the DAVEnet (refer, for example, to Non Patent Literature 1). Therefore, as in the present embodiment, the self-attention layer is disposed on the output side of the DAVEnet, and as a result, segments of important words are expected to be obtained from the audio caption.

The audio encoder 123 supplies the output of the self-attention layer to a cony layer constituted by d filters having a kernel size of 1×17, and outputs a d×T/16 tensor. Furthermore, the audio encoder 123 performs the temporal mean pooling in a temporal meanpool layer, and outputs a d-dimensional audio feature vector $v_i^E$, $v_i^H$, or $v_i^J$. The audio feature calculation unit 121 obtains the audio feature vector output from the audio encoder 123 as the audio feature.

As described above, in the audio feature calculation unit 121, based on the intermediate feature having elements for each temporal segment obtained in the process of calculating the audio feature, the self-attention mechanism outputs the self-attention map representing the degree of similarity between the elements, and calculate the audio feature using the audio encoder that further obtains the intermediate feature by multiplying the intermediate feature by the self-attention map. In the present embodiment, the self-attention mechanism is implemented as the self-attention layer.

The learning device 10 trains the parameters of the encoders so as to dispose the image feature vector $v_i^I$ and the audio feature vectors $v_i^E$, $v_i^H$, and $v_i^J$ close to one another in the latent space 170. Therefore, the loss function forming unit 131 forms a triplet loss having 12 directional components for each set obtained by combining two feature vectors (refer, for example, to Reference Literature 3) as a loss function. The loss function is not limited to the triplet loss, and may be, for example, a loss with semi-hard negative mining or a masked margin softmax loss (refer, for example, to Non Patent Literature 1 and Reference Literature 4).

Reference Literature 3: D. Harwath, G. Chuang, and J. Glass, "Vision as an Interlingua: Learning Multilingual Semantic Embeddings of Untranscribed Speech," in Proc. ICASSP, 2018.

Reference Literature 4: G. Ilharco, Y. Zhang, and J. Baldridge, "Large-Scale Representation Learning from Visually Grounded Untranscribed Speech," in Proc. CoNLL, 2019.

The updating unit 132 updates the parameters of the encoders used by the image feature calculation unit 111 and the audio feature calculation unit 121 such that the image feature of a first image is similar to the audio feature of a speech corresponding to the first image. When a plurality of the audio features are used, the updating unit 132 updates the parameters such that the features including the audio features and the image features calculated for the respective languages are similar to one another. The number of pieces of the audio encoder information stored by the learning device 10 is not limited to that illustrated in FIG. 1. The number of pieces of the audio encoder information stored by the learning device 10 may be one, two, or four or more.

Figure 5:
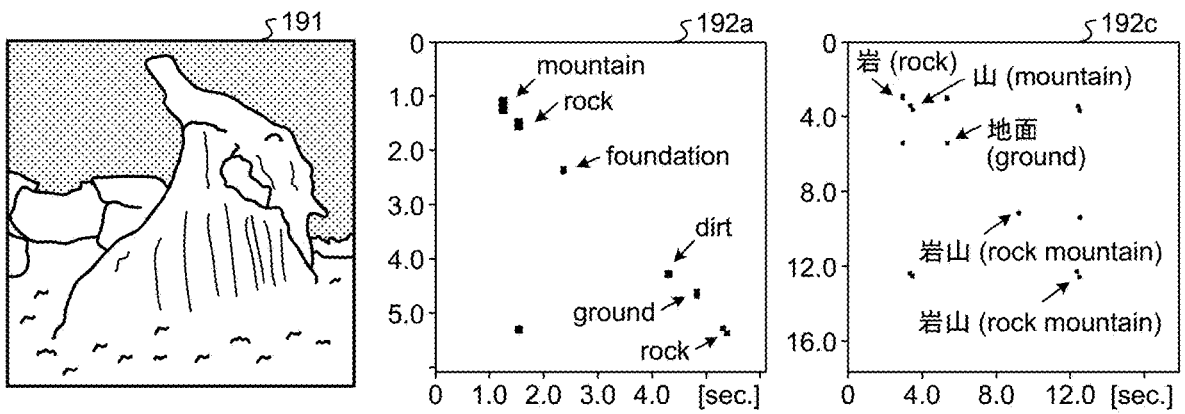
FIG. 5 is a diagram illustrating examples of self-attention maps.

Segments in the audio caption serving as the segments of important words for expressing the image appear in the self-attention map that is the output of the self-attention layer. FIG. 5 is a diagram illustrating examples of the self-attention maps. An image 191 is a photograph displaying a rock on a ground. A self-attention map 192a is obtained from an English audio caption corresponding to the image 191. A self-attention map 192c is obtained from a Japanese audio caption corresponding to the image 191. In each of the self-attention maps, segments of words for, for example, the rock, a mountain, and the ground are highlighted.

Processing of First Embodiment

Figure 6:
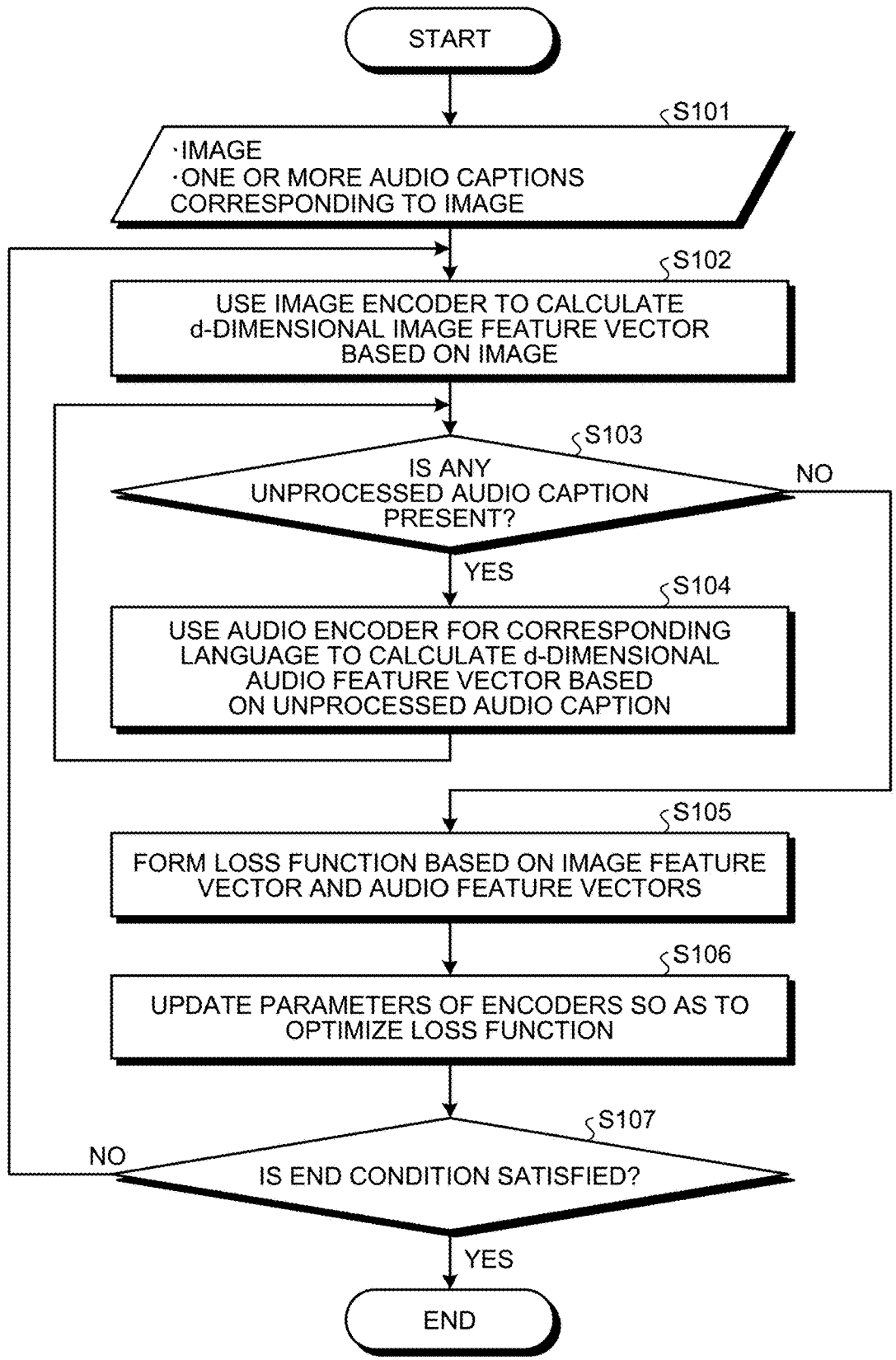
FIG. 6 is a flowchart illustrating a flow of processing of the learning device according to the first embodiment.

FIG. 6 is a flowchart illustrating a flow of processing of the learning device according to the first embodiment. As illustrated in FIG. 6, the learning device 10 first receives an image and one or more audio captions corresponding to the image (Step S101).

The image feature calculation unit 111 uses the image encoder to calculate the d-dimensional image feature vector based on the image (Step S102). If any unprocessed audio caption is present (Yes at Step S103), the audio feature calculation unit 121 uses an audio encoder for a corresponding one of the languages to calculate the d-dimensional audio feature vector based on the unprocessed audio caption (Step S104), and returns the process to Step S103. The calculation processing of the image feature vector (S102) and the calculation processing of the audio feature vector of each of the languages (S104) may be sequentially performed or performed in parallel.

If no unprocessed audio caption is present (No at Step S103), the loss function forming unit 131 forms the loss function based on the image feature vector and the audio feature vectors (Step S105). The updating unit 132 updates the parameters of the encoders so as to optimize the loss function (Step S106).

If an end condition is satisfied (Yes at Step S107), the learning device 10 ends the process. If, in contrast, the end condition is not satisfied (No at Step S107), the learning device 10 returns the process to Step S102, and uses the updated encoders to repeat the processing. The end condition is, for example, that all pieces of prepared data in the mini-batch have been processed, that the processing has been repeated a specified number of times, or that update widths of the parameters have converged.

Effects of First Embodiment

As described above, the image feature calculation unit 111 calculates the image feature using the model (image encoder) that receives the image and outputs the image feature obtained by mapping the image into the latent space. The audio feature calculation unit 121 calculates the audio features using the models (audio encoders) that receive the speeches in the predetermined languages and output the audio features obtained by mapping the speeches into the latent space, and that each include the neural network provided with the self-attention mechanism. The updating unit 132 updates the parameters of the models used by the image feature calculation unit 111 and the audio feature calculation unit 121 such that the image feature of the first image is similar to the audio features of the speeches corresponding to the first image. In this way, the models for outputting the audio features can identify the segments of important words for expressing the image using the self-attention mechanism. As a result, according to the present embodiment, the visual information can be accurately associated with the linguistic information.

The audio feature calculation unit 121 uses models each corresponding to one of a plurality of different languages to calculate the audio features of respective speeches in the languages. The updating unit 132 updates the parameters such that the features including the audio features and the image features calculated for the respective languages are similar to one another. In recent years, the crowdsourcing has spread, and as a result, the explanation of the image can be recorded as multilingual speeches if only a personal computer with a built-in microphone is available. The difference in language, however, leads to differences in duration and word count among the audio captions. According to the present embodiment, the models can be obtained that can map even the speeches in a plurality of languages into the same latent space.

The audio feature calculation unit 121 calculates the audio feature of each of the speeches that are speeches in the different languages and that have been made to have a fixed length by truncation or zero-padding. As a result, according to the present embodiment, even if the durations of the audio captions differ from one another, the feature vectors can be efficiently calculated. In addition, according to the present embodiment, setting the fixed length longer can restrain the information included in the audio caption from being lost.

In the audio feature calculation unit 121, based on the intermediate feature having the elements for each temporal segment obtained in the process of calculating each of the audio features, the self-attention mechanism outputs the self-attention map representing the degree of similarity between the elements, and calculate the audio feature using the model that further obtains the intermediate feature by multiplying the intermediate feature by the self-attention map. Therefore, according to the present embodiment, the important words for expressing the image can be identified.

From here on, processing will be described that actually performs inference using the above-described models trained by the learning device. The image encoder and the audio encoders after being trained enable cross-modal retrieval. The cross-modal retrieval refers to retrieval of data in different modals. The cross-modal retrieval includes, for example, retrieval of an image based on a speech, retrieval of a speech based on an image, and retrieval of a speech in a language based on a speech in another language. In the description of the embodiments, parts having the same functions as those of the already described embodiment will be denoted by the same reference numerals, and the description thereof will not be repeated where appropriate.

SECOND EMBODIMENT

Configuration of Second Embodiment

Figure 7:
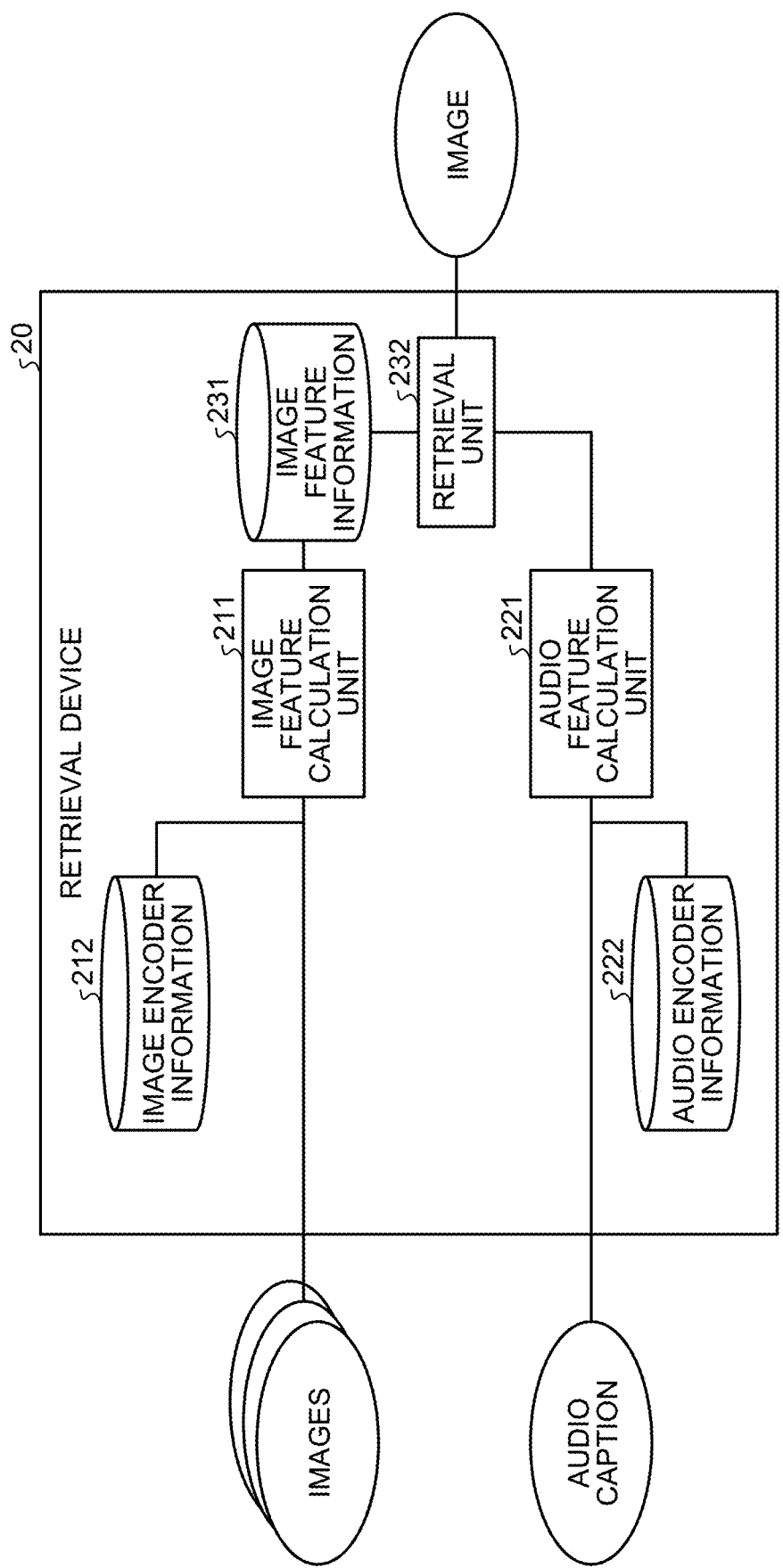
FIG. 7 is a diagram illustrating a configuration example of a retrieval device according to a second embodiment of the present invention.

In a second embodiment of the present invention, a retrieval device that retrieves an image based on a speech will be described. FIG. 7 is a diagram illustrating a configuration example of the retrieval device according to the second embodiment. As illustrated in FIG. 7, a retrieval device 20 includes an image feature calculation unit 211, an audio feature calculation unit 221, and a retrieval unit 232. The retrieval device 20 stores image encoder information 212, audio encoder information 222, and image feature information 231.

The retrieval device 20 receives an audio caption and a plurality of images. The audio caption received by the retrieval device 20 is a query for retrieval. The retrieval device 20 outputs an image or an image feature obtained by the retrieval.

In the same way as the image feature calculation unit 111 of the learning device 10, the image feature calculation unit 211 receives each of the images as an input, and calculates the image feature. The image encoder information 212 has been trained using the method described in the first embodiment. That is, the image feature calculation unit 211 calculates the image feature using the model that receives the image and outputs the image feature obtained by mapping the image into the latent space, and that is trained such that the image feature is similar to the feature obtained by mapping the speech corresponding to the image into the latent space. The image feature calculation unit 211 stores the calculated image feature as the image feature information 231.

In the same way as the image feature calculation unit 111 of the learning device 10, the audio feature calculation unit 221 receives the audio caption as an input, and outputs the audio feature. The audio encoder information 222 has been trained using the method described in the first embodiment. That is, the audio feature calculation unit 221 calculates the audio feature using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The retrieval device 20 may use a plurality of audio encoders corresponding to respective languages.

The retrieval unit 232 retrieves a combination of one of the images and the speech similar to each other based on the audio feature. The retrieval unit 232 retrieves, from the image feature information 231, one of the image features similar to the audio feature calculated based on the received audio caption, and outputs the obtained image feature or an image corresponding to the image feature. As described in the first embodiment, both the audio feature and the image features are mapped into the same latent space. More specifically, both the audio feature and the image features are d-dimensional vectors. Therefore, the retrieval unit 232 can easily compare the degrees of similarity between the audio feature and the image features by, for example, calculating inner products.

Processing of Second Embodiment

Figure 8:
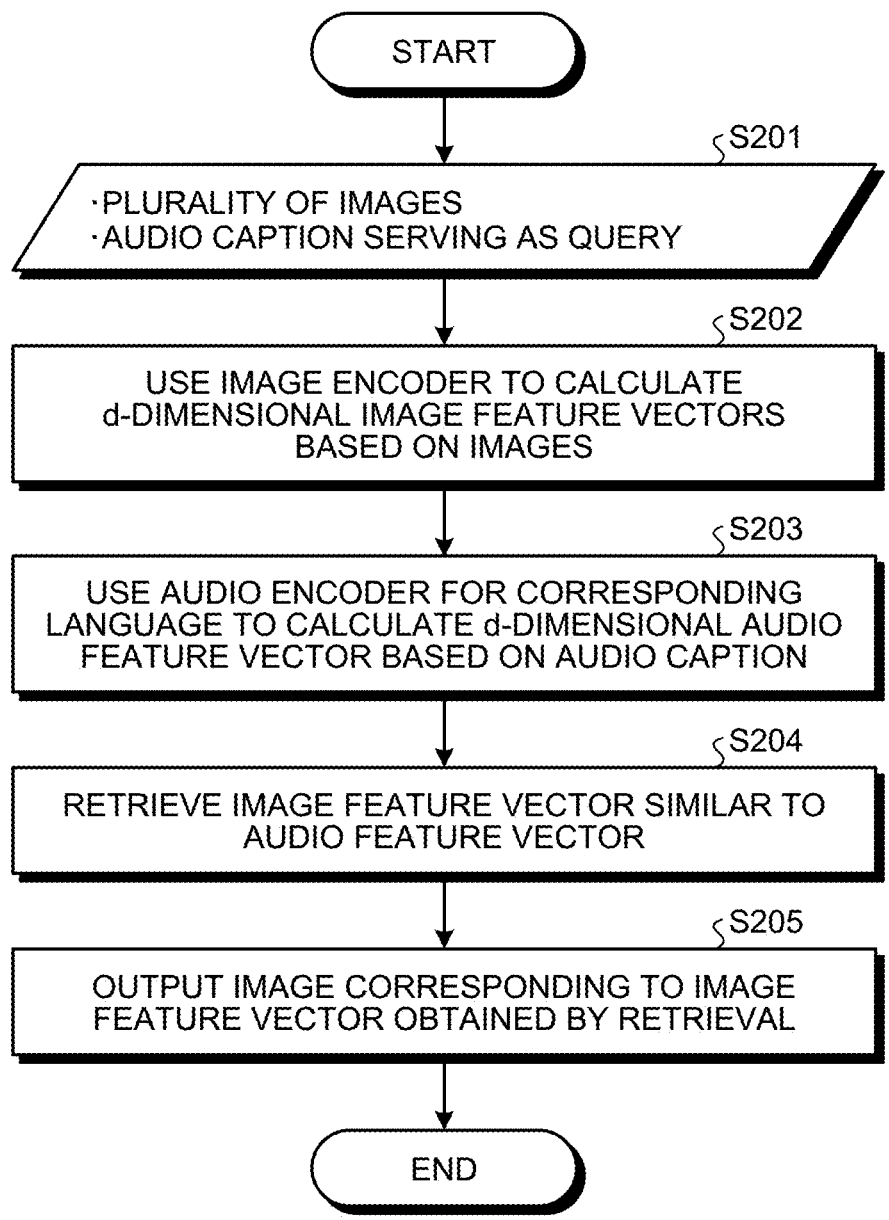
FIG. 8 is a flowchart illustrating a flow of processing of the retrieval device according to the second embodiment.

FIG. 8 is a flowchart illustrating a flow of processing of the retrieval device according to the second embodiment. As illustrated in FIG. 8, the retrieval device 20 first receives the images and the audio caption serving as the query (Step S201).

The image feature calculation unit 211 uses the image encoder to calculate the d-dimensional image feature vectors based on the images (Step S202). The audio feature calculation unit 221 uses the audio encoder for the corresponding language to calculate the d-dimensional audio feature vector based on the audio caption (Step S203).

The retrieval unit 232 retrieves one of the image feature vectors similar to the audio feature vector (Step S204). The retrieval unit 232 outputs one of the images corresponding to the image feature vector obtained by the retrieval (Step S205). The retrieval unit 232 may output the image feature vector obtained by the retrieval.

Effects of Second Embodiment

As described above, the audio feature calculation unit 221 calculates the audio feature using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The image feature calculation unit 211 calculates the image feature using the model that receives the image and outputs the image feature obtained by mapping the image into the latent space, and that is trained such that the image feature is similar to the feature obtained by mapping the speech corresponding to the image into the latent space. The retrieval unit 232 retrieves the combination of the image and the speech similar to each other based on the audio feature and the image feature. In this way, according to the second embodiment, the cross-modal retrieval can be performed to retrieve the image based on the speech.

THIRD EMBODIMENT

Configuration of Third Embodiment

Figure 9:
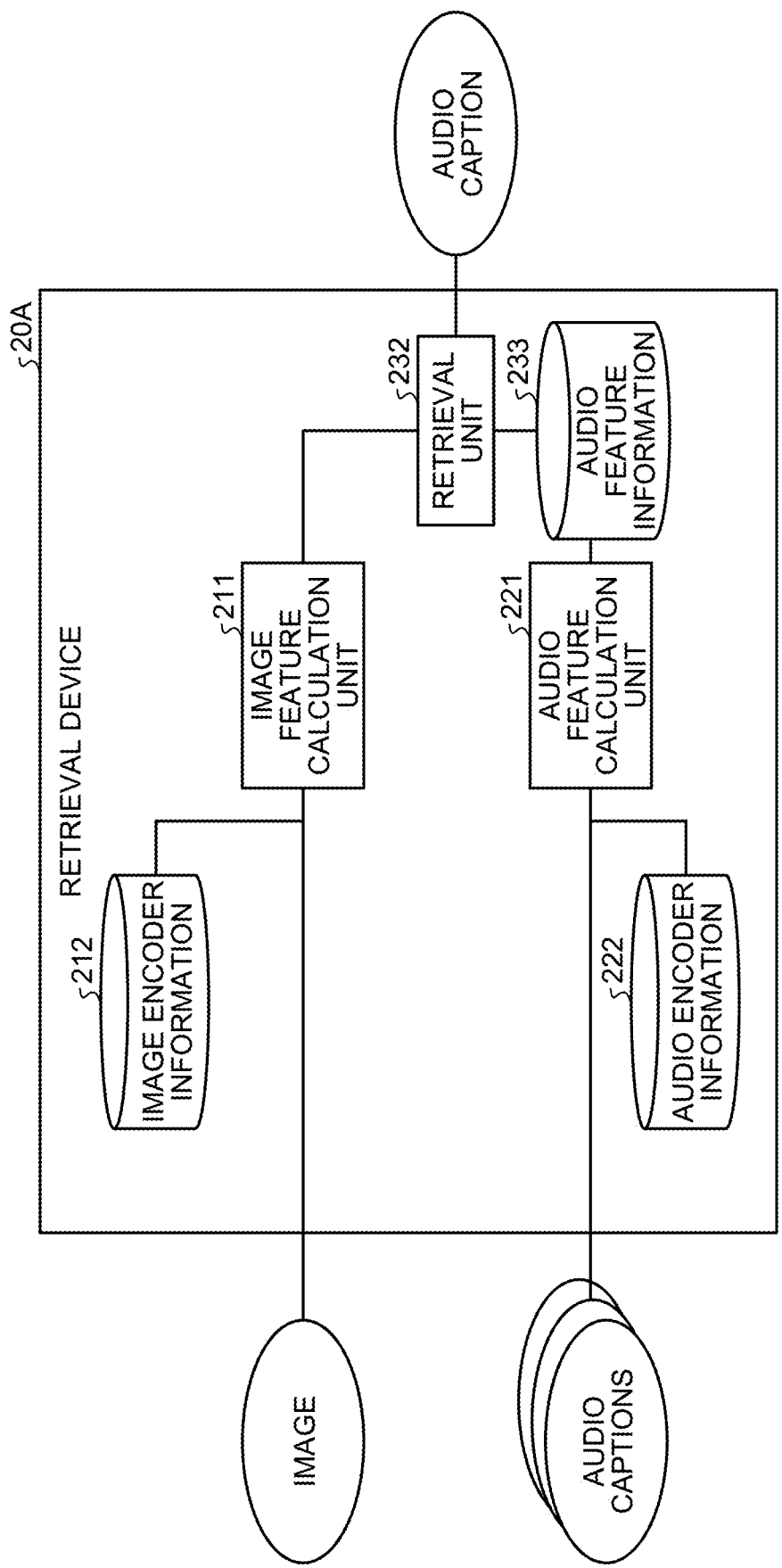
FIG. 9 is a diagram illustrating a configuration example of a retrieval device according to a third embodiment of the present invention.

In a third embodiment of the present invention, a retrieval device that retrieves a speech based on an image will be described. FIG. 9 is a diagram illustrating a configuration example of the retrieval device according to the third embodiment. As illustrated in FIG. 9, a retrieval device 20A includes the image feature calculation unit 211, the audio feature calculation unit 221, and the retrieval unit 232. The retrieval device 20A stores the image encoder information 212, the audio encoder information 222, and audio feature information 233.

The retrieval device 20A receives an image and a plurality of audio captions. The image received by the retrieval device 20A is a query for retrieval. The retrieval device 20A outputs an audio caption or an audio feature obtained by the retrieval.

The image feature calculation unit 211 and the audio feature calculation unit 221 perform the same processing as that of the second embodiment. However, the audio feature calculation unit 221 stores calculated audio features as the audio feature information 233.

The retrieval unit 232 retrieves a combination of the image and one of the speeches similar to each other based on the image feature. The retrieval unit 232 retrieves, from the audio feature information 233, one of the audio features similar to the image feature calculated based on the received image, and outputs the obtained audio feature or an audio caption corresponding to the audio feature.

Processing of Third Embodiment

Figure 10:
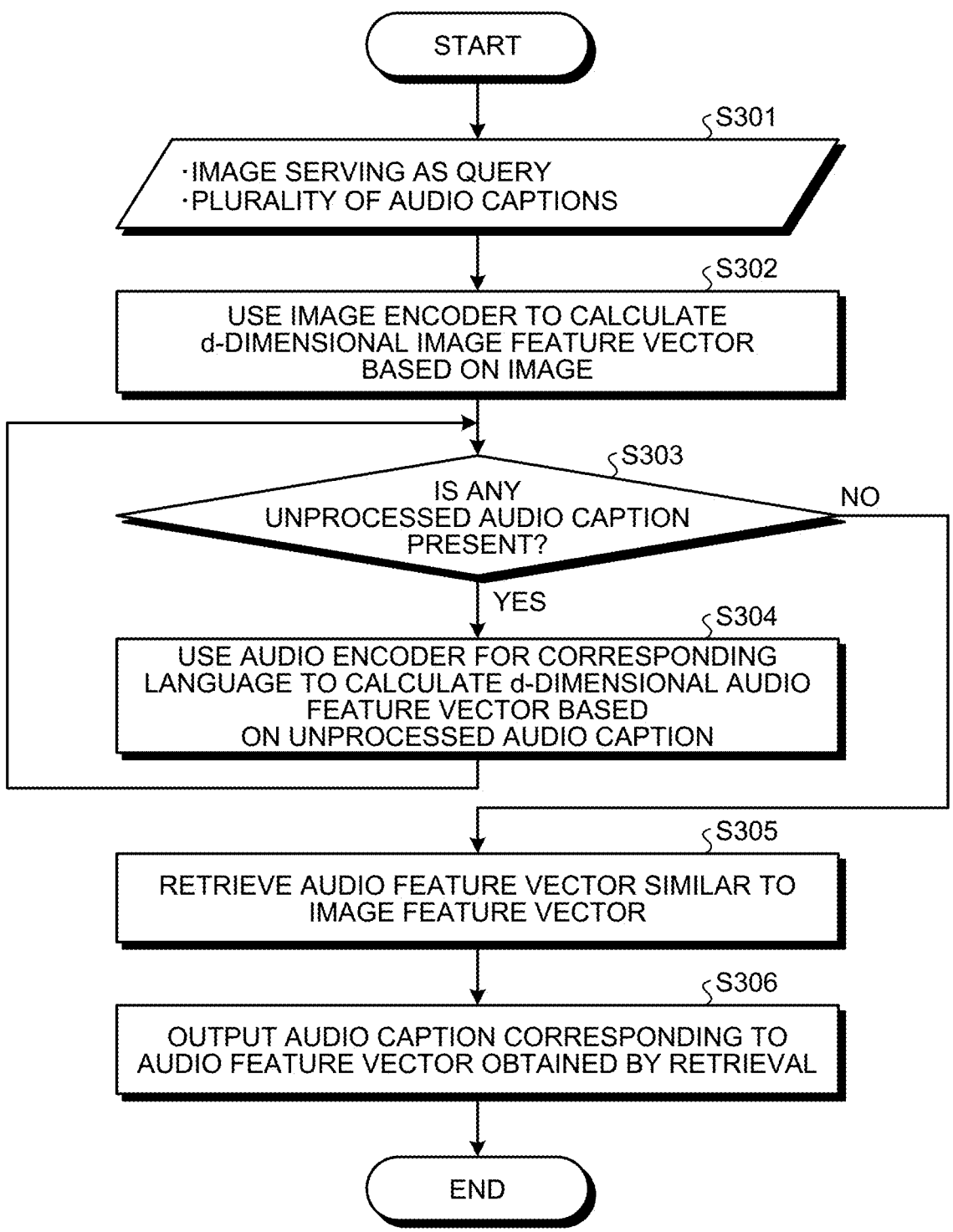
FIG. 10 is a flowchart illustrating a flow of processing of the retrieval device according to the third embodiment.

FIG. 10 is a flowchart illustrating a flow of processing of the retrieval device according to the third embodiment. As illustrated in FIG. 10, the retrieval device 20A first receives the image serving as the query and the audio captions (Step S301).

The image feature calculation unit 211 uses the image encoder to calculate the d-dimensional image feature vector based on the image (Step S302). If any unprocessed audio caption is present (Yes at Step S303), the audio feature calculation unit 221 uses an audio encoder for a corresponding one of the languages to calculate the d-dimensional audio feature vector based on the unprocessed audio caption (Step S304), and returns the process to Step S303.

If no unprocessed audio caption is present (No at Step S303), the retrieval unit 232 retrieves one of the audio feature vectors similar to the image feature vector (Step S305). The retrieval unit 232 outputs one of the audio captions corresponding to the audio feature vector obtained by the retrieval (Step S306). The retrieval unit 232 may output the audio feature vector obtained by the retrieval.

Effects of Third Embodiment

As described above, the audio feature calculation unit 221 calculates the audio feature using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The image feature calculation unit 211 calculates the image feature using the model that receives the image and outputs the image feature obtained by mapping the image into the latent space, and that is trained such that the image feature is similar to the feature obtained by mapping the speech corresponding to the image into the latent space. The retrieval unit 232 retrieves the combination of the image and the speech similar to each other based on the audio feature and the image feature. In this way, according to the third embodiment, the cross-modal retrieval can be performed to retrieve the speech based on the image.

FOURTH EMBODIMENT

Configuration of Fourth Embodiment

Figure 11:
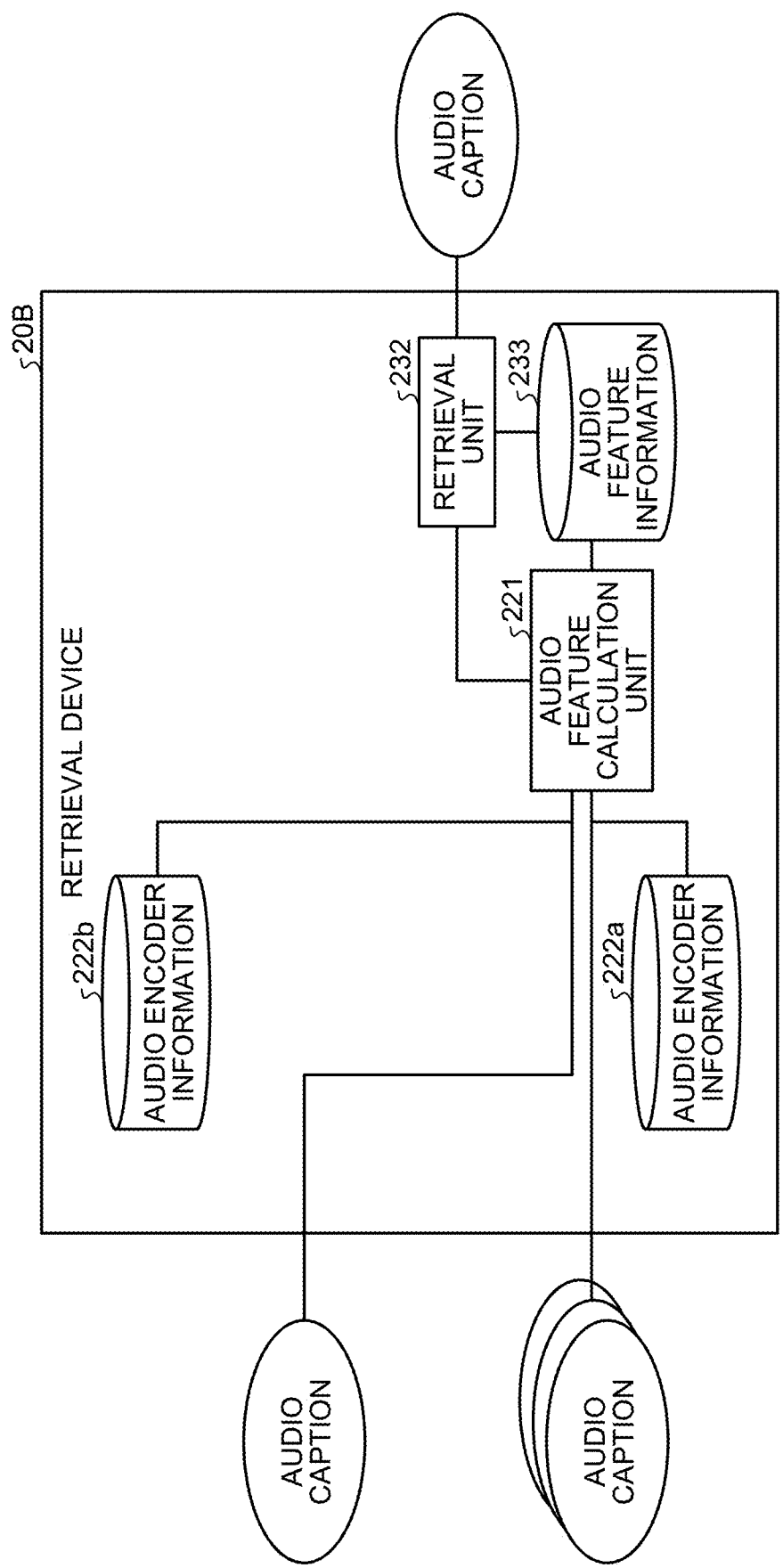
FIG. 11 is a diagram illustrating a configuration example of a retrieval device according to a fourth embodiment of the present invention.

In a fourth embodiment of the present invention, a retrieval device that retrieves a speech in a language based on a speech in another language will be described. FIG. 11 is a diagram illustrating a configuration example of the retrieval device according to the fourth embodiment. As illustrated in FIG. 11, a retrieval device 20B includes the audio feature calculation unit 221 and the retrieval unit 232. The retrieval device 20B stores audio encoder information 222a and audio encoder information 222b. For example, an audio encoder corresponding to English is built from the audio encoder information 222a, and an audio encoder corresponding to Hindi is built from the audio encoder information 222b.

The retrieval device 20B receives a plurality of audio captions in a language and an audio caption in another language. In this case, the retrieval device 20B receives the audio captions in English and Hindi. The audio caption in Hindi received by the retrieval device 20B is a query for retrieval. The retrieval device 20B outputs an audio caption in English or an audio feature obtained by the retrieval.

The audio feature calculation unit 221 performs the same processing as that of the second embodiment. However, the audio feature calculation unit 221 stores audio features calculated based on the audio captions in English as the audio feature information 233.

The retrieval unit 232 retrieves a combination of speeches similar to each other based on the audio features. The retrieval unit 232 retrieves, from the audio feature information 233, one of the audio features in English similar to an audio feature calculated based on the received audio caption in Hindi, and outputs the obtained audio feature or an audio caption corresponding to the audio feature.

Processing of Fourth Embodiment

Figure 12:
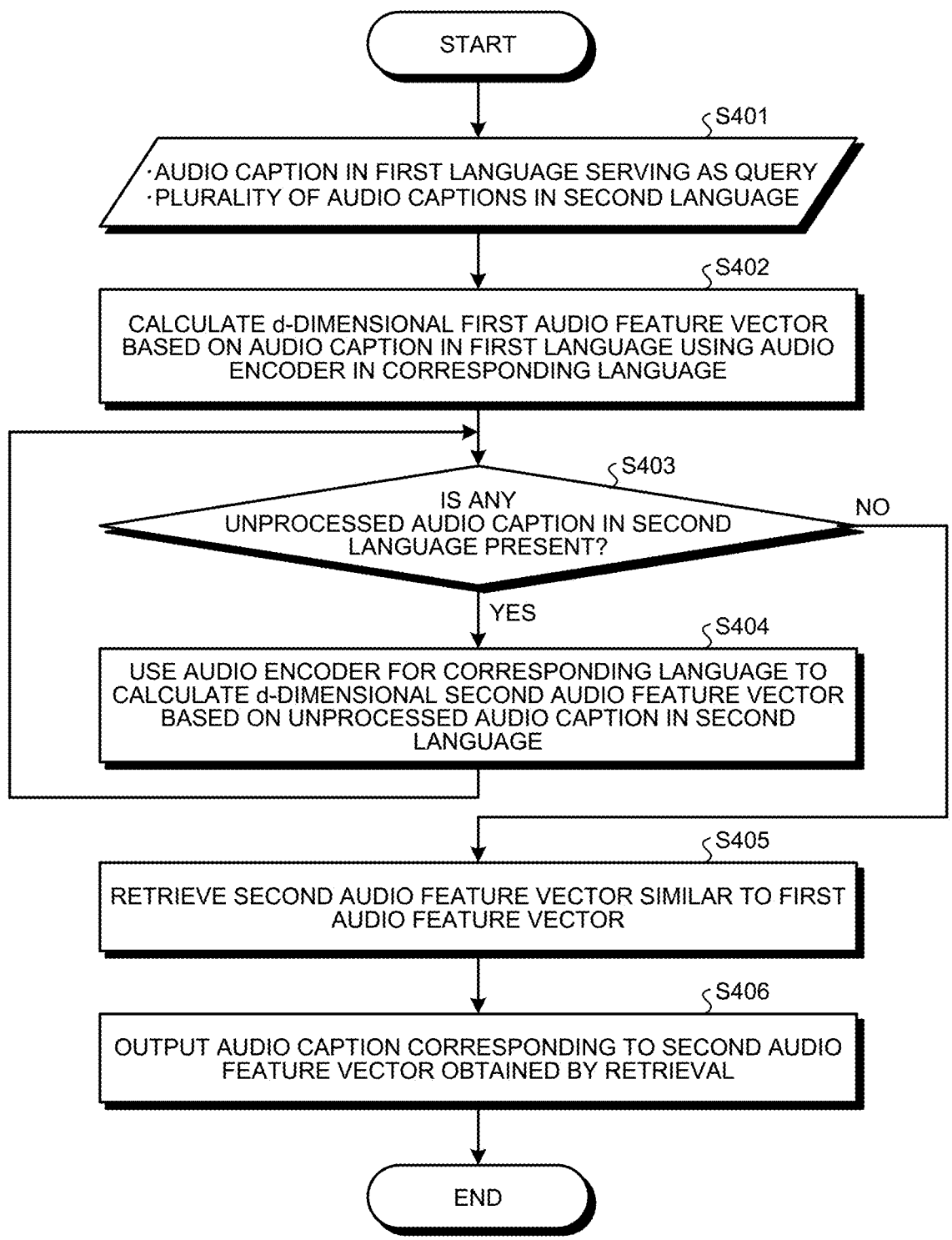
FIG. 12 is a flowchart illustrating a flow of processing of the retrieval device according to the fourth embodiment.

FIG. 12 is a flowchart illustrating a flow of processing of the retrieval device according to the fourth embodiment. As illustrated in FIG. 12, the retrieval device 20B first receives an audio caption in a first language serving as the query and a plurality of audio captions in a second language (Step S401). The audio caption in the first language is, for example, an audio caption in Hindi. The audio captions in the second language are, for example, audio captions in English.

The audio feature calculation unit 221 calculates a d-dimensional first audio feature vector based on the audio caption in the first language using a corresponding audio encoder (Step S402). If any unprocessed audio caption in the second language is present (Yes at Step S403), the audio feature calculation unit 221 uses an audio encoder for a corresponding one of the languages to calculate a d-dimensional second audio feature vector based on the unprocessed audio caption in the second language (Step S404), and returns the process to Step S403.

If no unprocessed audio caption is present (No at Step S403), the retrieval unit 232 retrieves one of the second audio feature vectors similar to the first audio feature vector (Step S405). The retrieval unit 232 outputs one of the audio captions corresponding to the second audio feature vector obtained by the retrieval (Step S406).

Effects of Fourth Embodiment

As described above, the audio feature calculation unit 221 calculates the audio feature using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. In this way, according to the fourth embodiment, the cross-modal (cross-lingual) retrieval between the speeches in different languages can be performed.

Experimental Results

The following describes experiments conducted using the retrieval devices according to the embodiments. In the experiments, the retrieval was performed using each of the retrieval devices of the embodiments using the encoders trained by the learning device of the first embodiment.

In the experiments, of 98555 sets of images and audio captions in the respective languages associated therewith, 97555 sets were used as data for learning, and 1000 sets were used as data for retrieval. The parameters were set as listed below.

Duration T of audio caption: Approximately 30 seconds
Number of dimensions d of latent space: 1024
Loss function: Triplet loss or margin softmax loss (minimized using stochastic gradient method)
Hyperparameter margin in loss function: 1
Batch size: 100
Momentum: 0.9
Weight decay: $5 \times 10^{-7}$
Learning rate: Scheduled so as to decay by 1/10 for each 40 epochs from initial value of 0.001
Evaluation metric: Recall@N An approach was used in which, when first an evaluation feature vector forming a pair with a feature vector obtained from a query is retrieved from the 1000 sets, N sets having a high degree of similarity are determined. The retrieval is successful if the pair of the feature vector obtained from the query and the evaluation feature vector is included in the N sets. At this time, the percentage of successful retrieval is denoted as Recall@N. Recall@N may be abbreviated as R@N.

FIG. 13 is a chart illustrating experimental results obtained using monolingual models. The term "monolingual model" refers to each encoder when the learning is performed using only one language. FIG. 14 is a chart illustrating experimental results obtained using multilingual models. The term "multilingual model" refers to each encoder when the learning is performed using a plurality of languages. The models illustrated in FIG. 4 are examples of the multilingual model.

The symbols E, H, and J correspond to the audio captions in English, Hindi, and Japanese, respectively. The title "Audio to Image" means that an image was retrieved based on an audio caption serving as the query (corresponding to the second embodiment). The title "Image to Audio" means that an audio caption was retrieved based on an image serving as the query (corresponding to the third embodiment). The title "w/self-attention layer" means that the self-attention layer was used. The title "w/o self-attention layer" means that the self-attention layer was not used. FIGS. 13 and 14 demonstrate that using the self-attention layer tends to improve Recall@N on the whole.

FIG. 15 is a chart illustrating experimental results of retrieval between different languages. This experiment corresponds to the fourth embodiment. FIG. 15 demonstrates that using the self-attention layer tends to improve Recall@N on the whole.

FIFTH EMBODIMENT

Configuration of Fifth Embodiment

Figure 16:
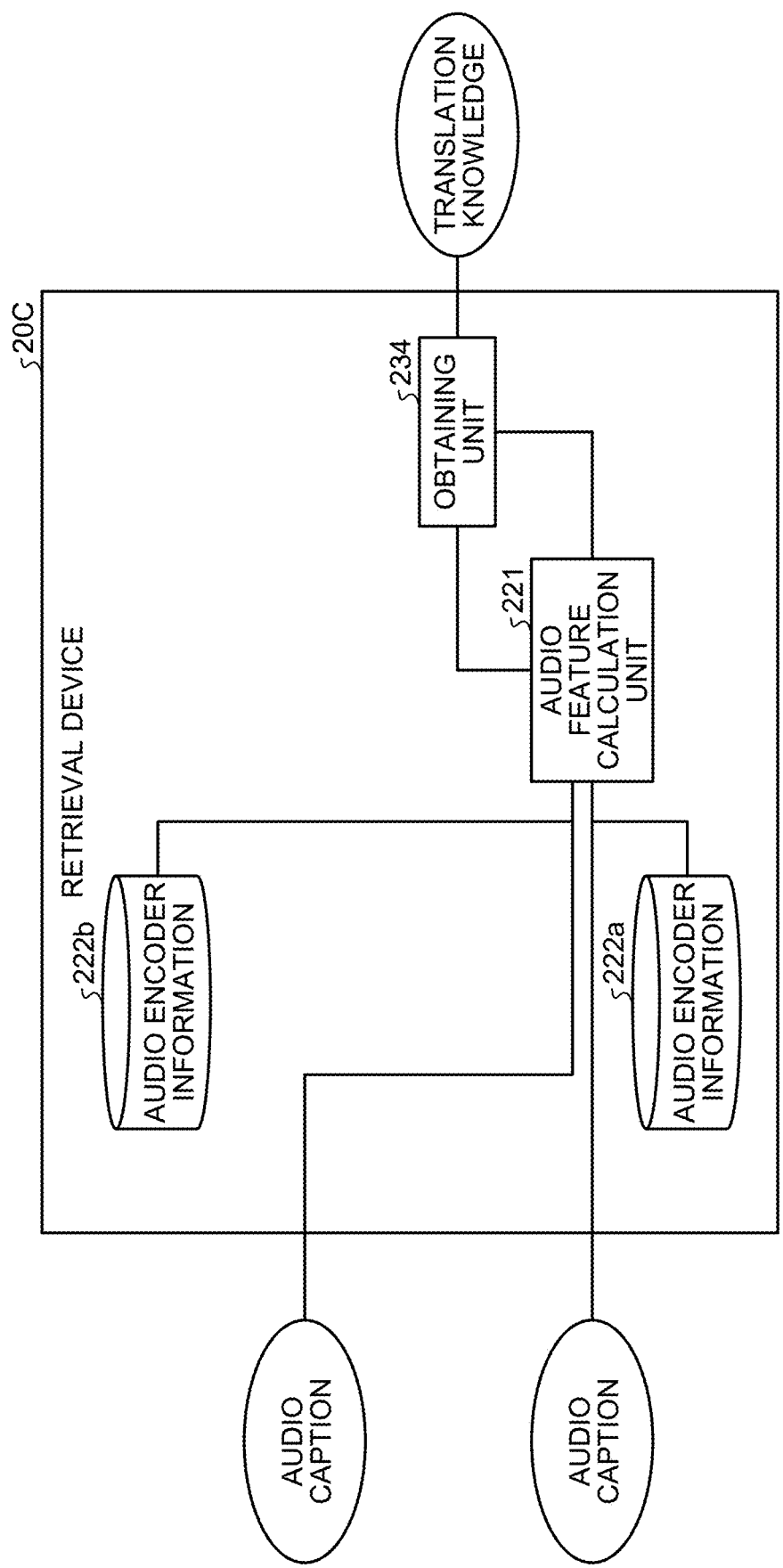
FIG. 16 is a diagram illustrating a configuration example of a retrieval device according to a fifth embodiment of the present invention.

In a fifth embodiment of the present invention, a retrieval device obtains translation knowledge between different languages. FIG. 16 is a diagram illustrating a configuration example of the retrieval device according to the fifth embodiment. A retrieval device 20C has the same configuration as that of the retrieval device 20B of the fourth embodiment. However, unlike the retrieval device 20B, the retrieval device 20C includes an obtaining unit 234.

The audio feature calculation unit 221 calculates the audio feature of each of the speech in the first language and the speech in the second language corresponding to the same image using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The obtaining unit 234 obtains, based on the audio features, information representing correspondence relations between words included in the speech in the first language and words included in the speech in the second language.

The obtaining unit 234 obtains the correspondence relations between the languages using the intermediate features before the temporal mean pooling is performed by the audio encoder. For example, the obtaining unit 234 can use the T/16×1024 intermediate features output from the audio encoders 123 illustrated in FIG. 4. In the present embodiment, T is 3072. In this case, each of the intermediate features is a 192×1024 matrix. For example, when the intermediate feature of the audio caption in the first language is $X_A \in R^{192 \times 1024}$, and the intermediate feature of the audio caption in the second language is $X_B \in R^{192 \times 1024}$, the obtaining unit 234 can calculate an inner product of the intermediate features in the respective languages as a correspondence relation map M as given by Expression (3).

$$M = X_A X_B^T \quad (3)$$

Processing of Fifth Embodiment

Figure 17:
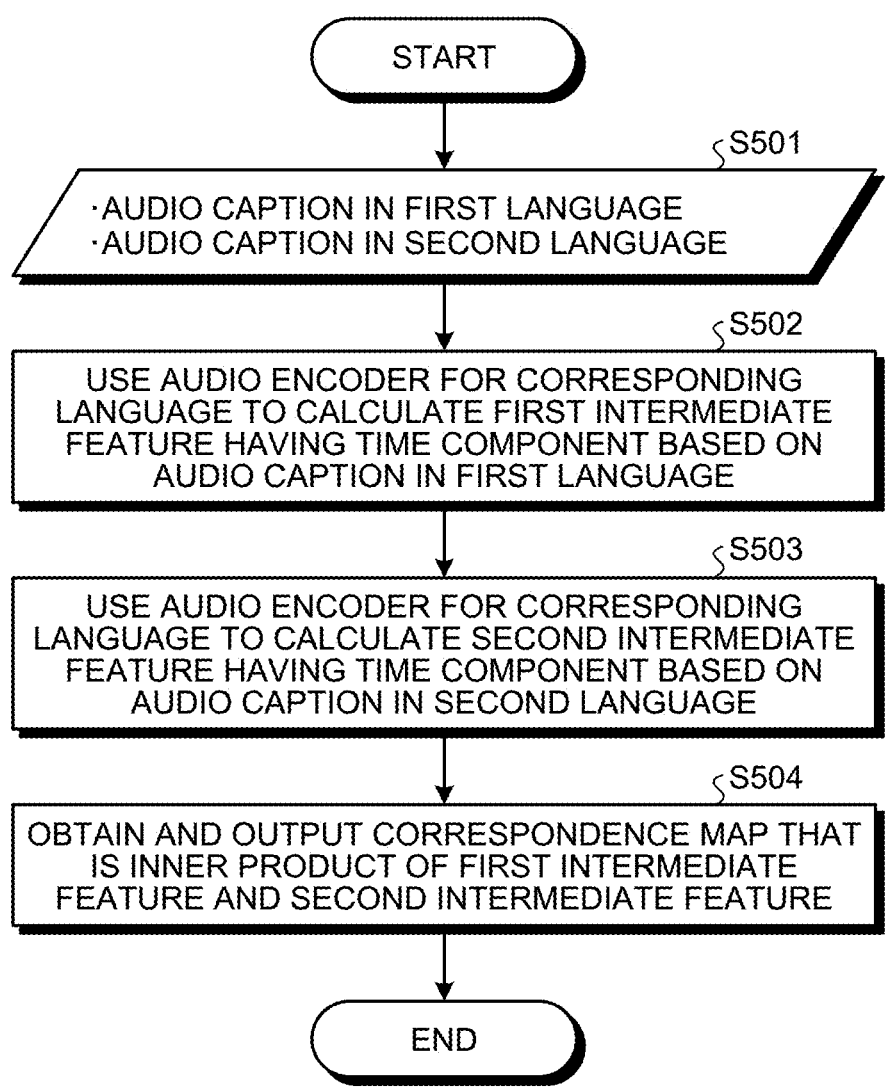
FIG. 17 is a flowchart illustrating a flow of processing of the retrieval device according to the fifth embodiment.

FIG. 17 is a flowchart illustrating a flow of processing of the retrieval device according to the fifth embodiment. As illustrated in FIG. 17, the retrieval device 20C first receives the audio caption in the first language and the audio caption in the second language (Step S501). The audio caption in the first language is, for example, an audio caption in Hindi. The audio caption in the second language is, for example, an audio caption in English.

The audio feature calculation unit 221 uses an audio encoder for a corresponding one of the languages to calculate a first intermediate feature having a time component based on the audio caption in the first language (Step S502). The audio feature calculation unit 221 uses an audio encoder for a corresponding one of the languages to calculate a second intermediate feature having a time component based on the audio caption in the second language (Step S503). Furthermore, the obtaining unit 234 obtains and outputs a correspondence map that is an inner product of the first intermediate feature and the second intermediate feature (Step S504).

Effects of Fifth Embodiment

The audio feature calculation unit 221 calculates the audio feature of each of the speech in the first language and the speech in the second language corresponding to the same image using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The obtaining unit 234 obtains, based on the audio features, the information representing the correspondence relations between the words included in the speech in the first language and the words included in the speech in the second language.

Therefore, according to the present embodiment, the translation knowledge between different languages can be accurately obtained.

FIG. 18 is a diagram illustrating examples of the translation knowledge. FIG. 18 illustrates the correspondence relation maps obtained by the obtaining unit 234. As illustrated in FIG. 18, using the self-attention mechanism (w/) makes the correspondence relation between the different languages clearer than in the case of not using the self-attention mechanism (w/o). The retrieval device 20C extracts segments in which a value of the correspondence map is equal to or higher than a threshold δ, and thus can obtain the correspondence relations between the words in the audio captions in the different languages as the translation knowledge. The retrieval device 20C may apply speech recognition to the segments to transcribe the translation knowledge. The translation knowledge may be obtained as a by-product of the retrieval in the fourth embodiment.

System Configuration, Etc.

The components of the devices illustrated in the drawings are merely functionally conceptual, and need not be physically configured as illustrated in the drawings. In other words, the specific modes of dispersion and integration of the devices are not limited to those illustrated in the drawings, and all or some of the devices can be configured in a functionally or physically dispersed or integrated manner in any units according to various types of loads or use conditions. Furthermore, all or any part of the processing functions performed by the devices can be implemented by a central processing unit (CPU) or a computer program that is analyzed and executed by the CPU, or can be implemented as hardware based on a wired logic.

Of the processes described in the embodiments described herein, all or some of the processes described as automatically performed can also be manually performed, and all or some of the processes described as manually performed can also be automatically performed using known methods. In addition, the information including the processing procedures, the control procedures, the specific names, and the various types of data and parameters illustrated in the above description and the drawings can be freely modified unless otherwise specified.

Computer Programs

As an embodiment, the learning device 10 and the retrieval device 20 can each be implemented by installing a computer program for executing the above-described learning processing or retrieval processing as package software or on-line software on a desired computer. For example, an information processing device can serve as the learning device 10 or the retrieval device 20 by executing the above-described computer program. Examples of the information processing device mentioned herein include a desktop personal computer and a laptop personal computer. Other examples of the information processing device in that category include mobile communication terminals such as a smartphone, a mobile phone, and a Personal Handy-phone System (PHS) device, and further, slate computers such as a personal digital assistant (PDA).

A terminal device used by a user may be treated as a client, and the learning device 10 and the retrieval device 20 may be implemented as server devices that provide services related to the learning processing and the retrieval processing to the client. For example, one of the server devices is implemented as a server device that provides a service that receives the data for learning and outputs the information on the encoders after being trained. In this case, the server device may be implemented as a web server, or may be implemented as a cloud that provides the service related to the above-described processing through outsourcing.

Figure 19:
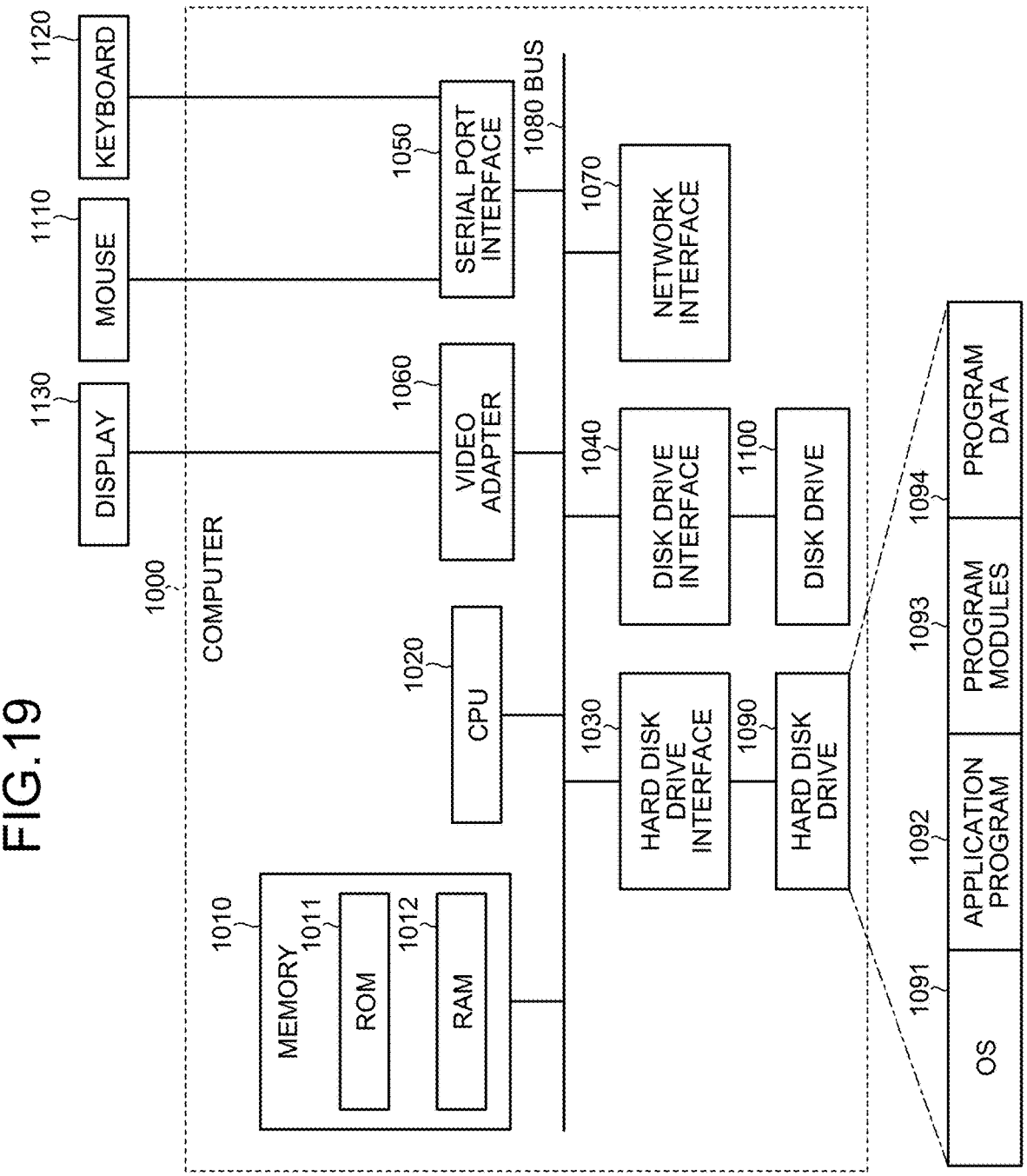
FIG. 19 is a diagram illustrating an example of a computer for executing a learning program.

FIG. 19 is a diagram illustrating an example of a computer for executing the learning program. The retrieval program may be executed by the same type of computer. A computer 1000 includes, for example, a memory 1010, and a CPU 1020. The computer 1000 also includes a hard disk drive interface 1030, a disk drive interface 1040, a serial port interface 1050, a video adapter 1060, and a network interface 1070. These parts are connected through a bus 1080.

The memory 1010 includes a read-only memory (ROM) 1011 and a random-access memory (RAM) 1012. The ROM 1011 stores therein, for example, a boot program such as the Basic Input-Output System. The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, program modules 1093, and program data 1094. That is, the computer program defining the processes of the learning device 10 is implemented as the program modules 1093 describing codes executable by the computer. The program modules 1093 are stored in, for example, the hard disk drive 1090. For example, the hard disk drive 1090 stores therein the program modules 1093 for executing the same processes as the functional components in the learning device 10. The hard disk drive 1090 may be substituted by a solid-state drive (SSD).

The setting data used in the processing of the embodiments described above is stored as the program data 1094 in, for example, the memory 1010 or the hard disk drive 1090. The CPU 1020 reads the program modules 1093 and the program data 1094 stored in the memory 1010 and the hard disk drive 1090 into the RAM 1012 as required, and executes the processing of the embodiments described above. The CPU 1020 may be coupled to the memory 1010 and programmed to execute a process of the embodiments described above.

The program modules 1093 and the program data 1094 are not limited to being stored in the hard disk drive 1090, and may be stored in, for example, a non-transitory computer-readable removable storage medium and read by the CPU 1020 through the disk drive 1100 or the like. Alternatively, the program modules 1093 and the program data 1094 may be stored in another computer connected through a network (for example, a local area network (LAN) or wide area network (WAN)). The program modules 1093 and the program data 1094 may be read by the CPU 1020 from the other computer through the network interface 1070.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A learning device comprising: a memory; and a processor coupled to the memory and programmed to execute a process comprising:
   firstly calculating an image feature using a model that receives an image and outputs the image feature obtained by mapping the image into a first space;
   secondly calculating an audio feature using a model that receives a speech in a predetermined language and outputs the audio feature obtained by mapping the speech into the first space, and that includes a neural network provided with a self-attention mechanism; and
   updating parameters of the models used by the firstly calculating and the secondly calculating such that the image feature of a first image is similar to the audio feature of a speech corresponding to the first image,
   wherein the secondly calculating outputs, based on an intermediate feature having elements for each temporal segment obtained in a process of calculating the audio feature, using the self-attention mechanism, a self-attention map representing a degree of similarity between the elements, and calculates the audio feature by multiplying the intermediate feature by the self-attention map.

2. The learning device according to claim 1, wherein
   the secondly calculating uses models each corresponding to one of a plurality of different languages to calculate the audio features of respective speeches in the languages, and
   the updating updates the parameters such that features including the audio features and the image features calculated for the respective languages are similar to one another.

3. The learning device according to claim 2, wherein the secondly calculating calculates the audio feature of each of the speeches in the different languages made to have a fixed length by truncation or zero-padding.

4. A learning method to be carried out by a learning device, the learning method comprising:
   calculating an image feature using a model that receives an image and outputs the image feature obtained by mapping the image into a first space;
   calculating an audio feature using a model that receives a speech in a predetermined language and outputs the audio feature obtained by mapping the speech into the first space, and that includes a neural network provided with a self-attention mechanism; and
   updating parameters of the models used by the calculating of the image feature and the calculating of the audio feature such that the image feature of a first image is similar to the audio feature of a speech corresponding to the first image,
   wherein in the calculating of the audio feature, a self-attention map representing a degree of similarity between elements is output based on an intermediate feature having the elements for each temporal segment obtained in a process of calculating the audio feature and using the self-attention mechanism, and the audio feature is calculated by multiplying the intermediate feature by the self-attention map.

5. A non-transitory computer-readable recording medium having stored therein a program, for learning, that causes a computer to execute a process, comprising:
   calculating an image feature using a model that receives an image and outputs the image feature obtained by mapping the image into a first space;
   calculating an audio feature using a model that receives a speech in a predetermined language and outputs the audio feature obtained by mapping the speech into the first space, and that includes a neural network provided with a self-attention mechanism; and
   updating parameters of the models used by the calculating of the image feature and the calculating of the audio feature such that the image feature of a first image is similar to the audio feature of a speech corresponding to the first image,
   wherein in the calculating of the audio feature, a self-attention map representing a degree of similarity between elements is output based on an intermediate feature having the elements for each temporal segment obtained in a process of calculating the audio feature and using the self-attention mechanism, and the audio feature is calculated by multiplying the intermediate feature by the self-attention map.

6. A retrieval device comprising: a memory; and a processor coupled to the memory and programmed to execute a process comprising:
   calculating an audio feature using a model that receives a speech in a predetermined language and outputs the audio feature obtained by mapping the speech into a first space, that includes a neural network provided with a self-attention mechanism, and that is trained such that the audio feature is similar to a feature obtained by mapping an image corresponding to the speech into the first space; and
   retrieving a combination of an image and a speech similar to each other or a combination of speeches similar to each other based on the audio feature,
   wherein in the calculating of the audio feature, a self-attention map representing a degree of similarity between elements is output based on an intermediate feature having the elements for each temporal segment obtained in a process of calculating the audio feature and using the self-attention mechanism, and the audio feature is calculated by multiplying the intermediate feature by the self-attention map.

7. The process according to claim 6, further comprising calculating an image feature using a model that receives an image and outputs the image feature obtained by mapping the image into the first space, and that is trained such that the image feature is similar to a feature obtained by mapping a speech corresponding to the image into the first space, wherein
   the retrieving retrieves the combination of the image and the speech similar to each other based on the audio feature and the image feature.

8. A retrieval method to be carried out by a retrieval device, the retrieval method comprising:
   calculating an audio feature using a model that receives a speech in a predetermined language and outputs the audio feature obtained by mapping the speech into a first space, that includes a neural network provided with a self-attention mechanism, and that is trained such that the audio feature is similar to a feature obtained by mapping an image corresponding to the speech into the first space; and
   retrieving a combination of an image and a speech similar to each other or a combination of speeches similar to each other based on the audio feature, wherein in the calculating of the audio feature, a self-attention map representing a degree of similarity between elements is output based on an intermediate feature having the elements for each temporal segment obtained in a process of calculating the audio feature and using the self-attention mechanism, and the audio feature is calculated by multiplying the intermediate feature by the self-attention map.

9. A non-transitory computer-readable recording medium having stored therein a program, for retrieval, that causes a computer to execute a process, comprising:

calculating an audio feature using a model that receives a speech in a predetermined language and outputs the audio feature obtained by mapping the speech into a first space, that includes a neural network provided with a self-attention mechanism, and that is trained such that the audio feature is similar to a feature obtained by mapping an image corresponding to the speech into the first space; and retrieving a combination of an image and a speech similar to each other or a combination of speeches similar to each other based on the audio feature, wherein in the calculating of the audio feature, a self-attention map representing a degree of similarity between elements is output based on an intermediate feature having the elements for each temporal segment obtained in a process of calculating the audio feature and using the self-attention mechanism, and the audio feature is calculated by multiplying the intermediate feature by the self-attention map.

* * * * *